(12) United States Patent
Ueno et al.

(10) Patent No.: US 9,311,428 B2
(45) Date of Patent: Apr. 12, 2016

(54) RESTORATION APPARATUS

(71) Applicant: FUJITSU LIMITED, Kawasaki-shi, Kanagawa (JP)

(72) Inventors: Kaoru Ueno, Kawasaki (JP); Takashi Nakao, Hachioji (JP); Yoshiyasu Sugiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 329 days.

(21) Appl. No.: 13/905,590

(22) Filed: May 30, 2013

(65) Prior Publication Data

US 2014/0012815 A1 Jan. 9, 2014

(30) Foreign Application Priority Data

Jul. 3, 2012 (JP) ................. 2012-149831

(51) Int. Cl.
*G06F 17/30* (2006.01)
*G06F 11/34* (2006.01)
*G06F 11/14* (2006.01)

(52) U.S. Cl.
CPC ...... *G06F 17/30943* (2013.01); *G06F 11/1469* (2013.01); *G06F 11/1417* (2013.01); *G06F 11/1448* (2013.01); *G06F 11/3476* (2013.01)

(58) Field of Classification Search
CPC ............ G06F 11/1417; G06F 11/1448; G06F 11/1469; G06F 11/3476; G06F 17/30943
USPC ................................. 707/634–727, 821–831
See application file for complete search history.

(56) References Cited

U.S. PATENT DOCUMENTS

| | | | | |
|---|---|---|---|---|
| 7,657,583 | B2 * | 2/2010 | Erdmenger | G06F 11/1469 707/674 |
| 8,260,754 | B2 * | 9/2012 | Tatebe | G06F 11/1456 707/675 |
| 2007/0067586 | A1 * | 3/2007 | Mikami | G06F 11/1471 711/162 |
| 2009/0222496 | A1 | 9/2009 | Liu et al. | |
| 2010/0313069 | A1 | 12/2010 | Murata | |

FOREIGN PATENT DOCUMENTS

| | | |
|---|---|---|
| JP | 2008-547123 | 12/2008 |
| JP | 2010-282468 | 12/2010 |
| WO | WO 2007/002397 | 1/2007 |

* cited by examiner

*Primary Examiner* — Taelor Kim
(74) *Attorney, Agent, or Firm* — Staas & Halsep LLP

(57) ABSTRACT

A restoration apparatus restores backup data without running an operating system (OS) until a time point until which the total amount of the data read out along with the start-up of the OS and a business system remains equal to or smaller than the total amount of the data that is restorable while running the OS and the business system, and subsequently restores the backup data in parallel with the start-up of the OS and the business system.

12 Claims, 11 Drawing Sheets

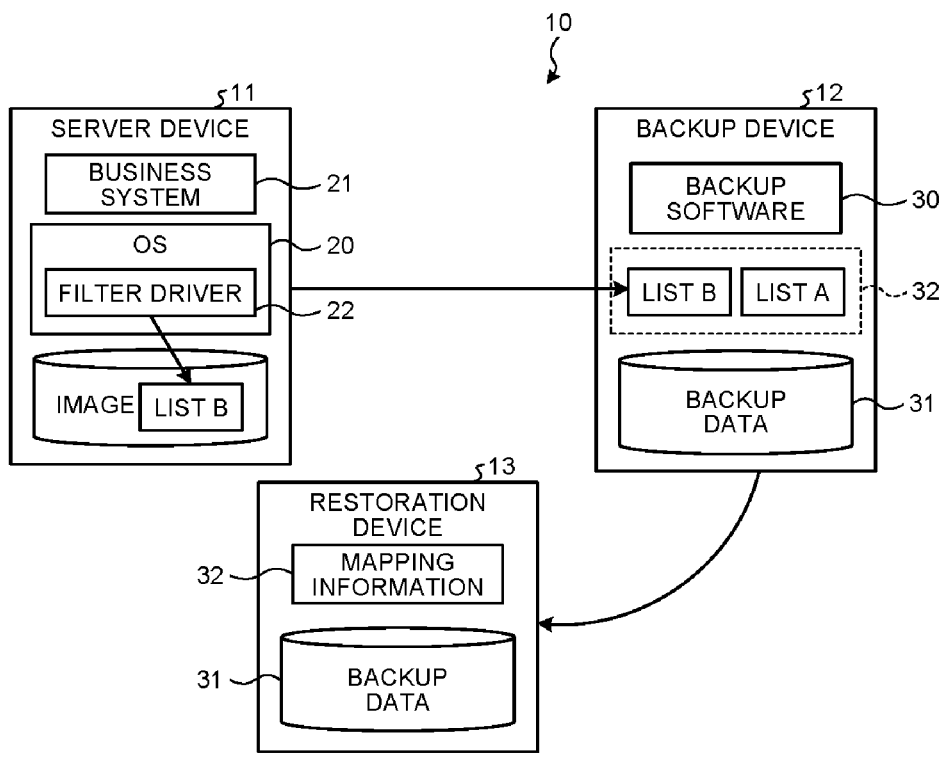

| READING ORDER | FILE NAME | READING TIME [MILLISECONDS] | FILE SIZE [Byte] |
|---|---|---|---|
| 1 | C:\···\A.exe | 500 | 4,356,456 |
| 2 | C:\···\B.dat | 510 | 345,322 |
| ... | ... | ... | ... |

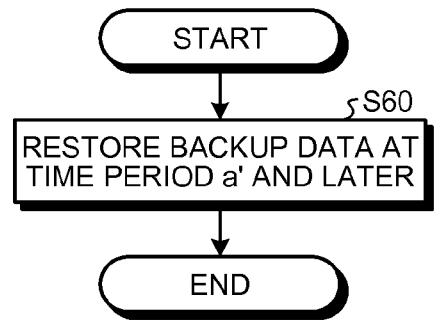
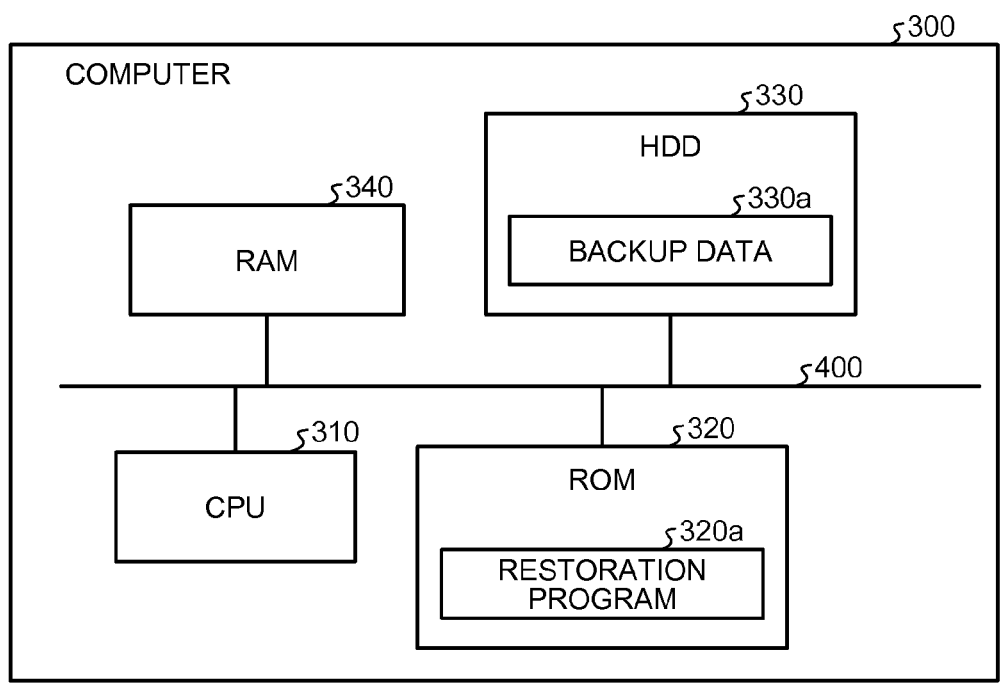

RESTORATION APPARATUS

CROSS-REFERENCE TO RELATED APPLICATIONS

This application is based upon and claims the benefit of priority of the prior Japanese Patent Application No. 2012-149831, filed on Jul. 3, 2012, the entire contents of which are incorporated herein by reference.

FIELD

The embodiments discussed herein are directed to a restoration program and a restoration apparatus.

BACKGROUND

Computers are recovered or replaced conventionally by backing up data and then restoring the backed up data in the case when trouble occurs. For example, data of an operating system (OS) or a business system operated on a computer is backed up for the replace of the computer. The backed up data is then restored on a hard disk of a target computer, for example. This can enable the business system to be resumed on the target computer.

With the conventional methods for replacing computers, however, the business system suspends a restart until restoration of the backed up data is completed. Accordingly to one conventional technology, information on storage areas accessed during activation of the OS is recorded so that the accessed information can be identified. Then, failure recovery is performed using the identified information only.

Patent Document 1 Japanese Laid-open Patent Publication No. 2010-282468

Patent Document 2 Japanese National Publication of International Patent Application No. 2008-547123

However, according to the above technology, not all data used in the business system is restored when the business system is activated. Hence, after the activation, the business system has to wait for the restoration of data, thus prolonging the time the operation does not proceed.

A restoration program according to one aspect of an embodiment of the present invention causes a computer to execute processing in which backup data of an operating system and a business system is restored without running the operating system until a predetermined time point. The predetermined time point is a time point until which the total amount of the data read out along with the start-up of the operating system and a predetermined business system remains equal to or smaller than the total amount of the data that can be restored from the backup data while running the operating system and the business system. The restoration program causes the computer to execute processing that starts up the operating system and the business system, after the backup data is restored until a predetermined time point. The restoration program then causes the computer to execute processing that restores the backup data at the predetermined time point and later, in parallel with the start-up of the operating system and the business system.

SUMMARY

According to an aspect of an embodiment, a computer-readable recording medium stores therein a program. The program causes a computer to execute a process including restoring backup data in which an operating system and a predetermined business system are backed up without running the operating system until a predetermined time point until which the total amount of the data read out along with the start-up of the operating system and the business system remains equal to or smaller than the total amount of the data that is restorable from the backup data while running the operating system and the business system; starting up the operating system and the business system, after the backup data is restored until the predetermined time point; and restoring the backup data at the predetermined time point and later, in parallel with the start-up of the operating system and the business system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is an exemplary diagram of the structure of a system according to a first embodiment;

FIG. 2 is an exemplary diagram of the structure of data in a list A according to the embodiment;

FIG. 16 is a flowchart of procedures of second restoration processing according to the embodiment; and FIG. 17 is a diagram of a computer executing a restoration program according to the embodiment.

DESCRIPTION OF EMBODIMENTS

Figures 3, 4:
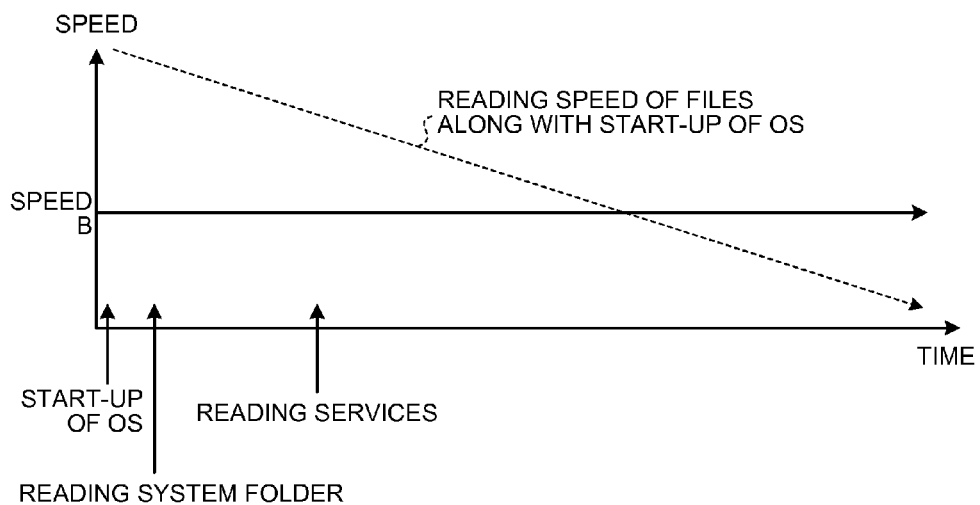
FIG. 3 is an exemplary diagram of the structure of data in a list B according to the embodiment.
FIG. 4 is a schematic diagram illustrating the change of reading speed of the data from the time of starting a computer according to the embodiment.

Preferred embodiments of the present invention will be explained with reference to accompanying drawings.

The embodiments recited herein are not to be construed as limitations of the invention to specifically recited examples and conditions. The embodiments of the present invention could be combined with each other unless the processing of the embodiments contradicts to each other.

[a] First Embodiment

A first embodiment will now be described. In the first embodiment, a system 10 will be described that replaces a computer by backing up data and then restoring the backed up data. FIG. 1 is an exemplary diagram of the structure of the system according to the first embodiment. The system 10 according to the present embodiment includes three server devices 11, 12, and 13.

The server device 11 is a computer to be replaced. An OS 20 is running on the server device 11, and a business system 21 is running on the OS 20. The OS 20 is software that provides basic functions utilized by many application software programs, and manages the computer as a whole. The backup device 12 is a computer that generates backup data 31 of the OS 20 and the business system 21. The restoration device 13 is a computer in which the backup data 31 is restored. In the present embodiment, the restoration device 13, for example, is a restoration apparatus. For the convenience of distinction, three server devices 11, 12, and 13, will be referred to as a server device 11, a backup device 12, and a restoration device 13.

Along with the start-up of the OS 20, a filter driver 22 is started up in the server device 11. The filter driver 22 monitors the readout of files along with the start-up of the OS 20. The filter driver 22 then generates a list B in which file names, time passed after the start-up of the filter driver 22 before read-out of each file starts, and a data amount of each file are recorded in the order of readout by the OS 20.

Backup software 30 that backs up the data is installed in the backup device 12. When the server device 11 is to be replaced, the server device 11 and the backup device 12 are connected and communicate to each other via a network (not shown in the drawings). Any wired or wireless communication networks can be used to connect the server device 11 and the backup device 12; e.g., the Internet, a local area network (LAN), a wide area network (WAN), and a virtual private network (VPN) can be used. The list B stored in the server device 11 is transmitted to the backup device 12. The backup device 12 stores therein the list B received from the server device 11. The backup device 12 also stores therein a list A. The list A includes records of files that are read out after the OS 20 is started up and before the filter driver 22 is started up. That is to say, the list A contains the files that are read before the filter driver 22 is started up in the server device 11. The list B contains the files that are read after the filter driver 22 is started up. The list A is not generated in backup processing but generated in advance for each type of hardware or an OS, by an administrator or a developer of the backup software 30, for example.

FIG. 2 is an exemplary diagram of the structure of data in the list A. As illustrated in FIG. 2, the list A includes an item of file name. The item of file name is a field that stores therein a path representing a file name and a location of the file read out along with the start-up of the OS 20. In FIG. 2, the file on the path "C:¥Autoexe.bat" is read out along with the start-up of the OS 20. In addition, the file on the path "C:¥config.sys" is read out along with the start-up of the OS 20 in FIG. 2. The list A may include, as illustrated in the list B described later, an item of reading order, which records numbers representing the order the files are read out by the OS 20 when it is started up.

FIG. 3 is an exemplary diagram of the structure of data in the list B. As illustrated in FIG. 3, the list B includes items of reading order, file names, reading time, and file sizes. The item of reading order is a field that stores therein numbers representing the order the files are read out after the filter driver 22 is started up. The item of reading time is a field that stores therein a time elapsed from the start-up of the filter driver 22 to the beginning of reading out the file in units of milliseconds. The item of file size is a field that stores therein an amount of data of the file read out in units of bytes. In FIG. 3, the file on the path "C:¥ . . . ¥A.exe" is read out firstly after the start-up of the filter driver 22, the time period to the beginning of reading out the files is "500" milliseconds, and the file size is "4,356,456" bytes. In addition, the file on the path "C:¥ . . . ¥B.dat" is read out secondarily after the start-up of the filter driver 22, the time to the beginning of reading out the file is "510" milliseconds, and the file size is "345,322" bytes in FIG. 3.

With reference to FIG. 1 again, the backup device 12 executes the backup software 30 and backs up the OS 20 and the business system 21 that operate on the server device 11. The backup software 30, for example, sequentially reads out the data of the files stored in the list A from the server device 11. The backup software 30 then sequentially reads out the data of the files stored in the list B. After that, the backup software 30 sequentially reads out the data of the files stored in neither the list A nor the list B. The backup software 30 then performs predetermined processing such as compression on the read out data to generate the backup data 31. The backup software 30 also generates mapping information 32 in which the list A and the list B are included and the backed up files are stored.

When the server device 11 is replaced, the backup data 31 generated by the backup device 12 is stored in the restoration device 13. In addition, the mapping information 32 including the list A and the list B is stored in the restoration device 13. In the present embodiment, the server device 11 is replaced by the restoration device 13 which restores the backup data 31. The restoration device 13 may read out and restore the backup data 31 and the mapping information 32 stored in the backup device 12 through a network.

Two types of restoration speed exist when the restoration device 13 restores the backup data 31: speed A and speed B. The speed A is a speed of restoration achieved when a restoration program runs on an OS which is dedicated for restoration (hereinafter "OS for restoration"). The speed B is a speed of restoration achieved when the restoration program runs on the OS 20 in background. The speed A is faster than the speed B since the activation of the OS 20 is not performed. Thus, the restoration can be achieved faster when the OS 20 is not started up. However, when the restoration is performed at the speed A without the activation of the OS 20, the business system 21 cannot operate. On the other hand, when the restoration is performed at the speed B, the business system 21 can operate since the OS 20 is started up. However, when the restoration is performed at the speed B, a relatively long time is required for restoring the backup data 31, and the business system 21 cannot resume operation until the restoration of data used by the business system 21 is complete.

It is to be noted that when starting up computers such as the server device 11, the backup device 12, and the restoration device 13, a large amount of data is read out in the initial stage of the start-up along with the start-up of the OS and the business system. After a certain period of time, the amount of read out data tends to decrease.

FIG. 4 is a schematic diagram illustrating a change of a reading speed of the data after the computer is started up. The vertical axis illustrated in FIG. 4 represents the reading speed of the data. The horizontal axis illustrated in FIG. 4 represents the time elapsed since the computer is started up. When a computer is started up, files in the system folder are read first so as to be used in the activation of the OS. Thereafter, other files are read to provide various types of services. As illustrated in FIG. 4, after a certain period of time has passed since the start-up of the computer, the reading speed lowers to a level equal to or slower than the speed B. When the reading speed is equal to or lower than the speed B, the restoration speed of the data from the backup data 31 is equal to or faster than the reading speed. Hence, after the reading speed becomes equal to or lower than the speed B, a total amount of data read out along with the activation of the OS is equal to or smaller than the total amount of data restored along with the activation of the OS. When the total amount of data read out at the activation is equal to or smaller than the total amount of data restored along with the activation of the OS, the restoration can be performed faster than the readout of the data, even if the restoration and the read out of the data for the OS and/or the business system are performed in parallel.

The restoration device 13, therefore, restores the backup data 31 without running the OS 20 during a period when the total amount of data read out for the activation of the OS 20 and the business system 21 is expected to be larger than the total amount of data restorable along with the activation of the OS 20 and the business system 21. After this period passes, the restoration device 13 starts up the OS 20 and the business system 21. Thereafter, the restoration device 13 restores the backup data 31, in parallel with the start-up of the OS 20 and the business system 21. As described above, the restoration device 13 restores the backup data 31 without running the OS 20 up to a predetermined time point, thereby restoring the OS 20 and the business system 21 faster. The restoration device 13 restores the backup data 31 in parallel with the start-up of the OS 20 and the business system 21 after the predetermined time point, thereby preventing the state in which the restoration of the data used for the OS 20 and the business system 21 has to be waited for. This enables the restoration device 13 to prevent a long business downtime.

Figures 5, 6:
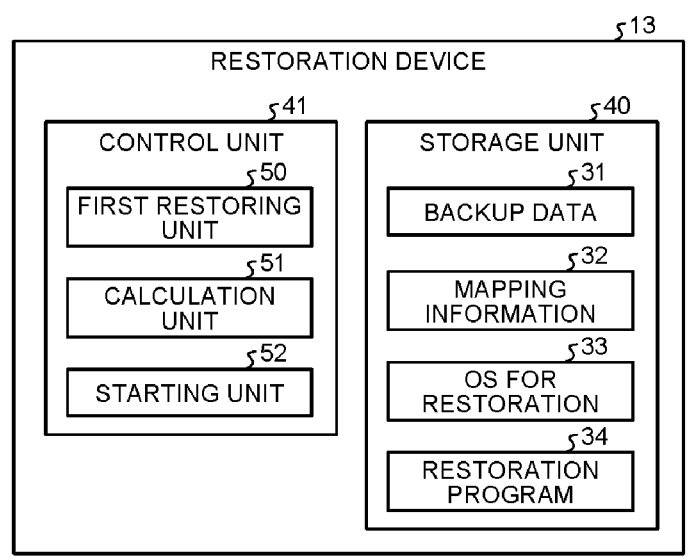
FIG. 5 is an exemplary diagram of the function structure of a restoration device that restores the backup data according to the embodiment.
FIG. 6 is an exemplary diagram of the structure of data in the list A in which the fact that restoration is complete is recorded according to the embodiment.

The structure of the restoration device 13 that restores backup data will now be described in detail with reference to FIG. 5. FIG. 5 is an exemplary diagram of the function structure of a restoration device that restores the backup data. As illustrated in FIG. 5, the restoration device 13 includes a storage unit 40 and a control unit 41.

The storage unit 40 is a storage device such as a hard disk, a solid state drive (SSD), and an optical disc drive. The storage unit 40 may be a rewritable semiconductor memory such as a flash memory and a non-volatile static random access memory (NVSRAM).

The storage unit 40 stores therein various types of information. For example, the storage unit 40 stores therein the backup data 31, the mapping information 32, an OS for restoration 33, and a restoration program 34 that performs various types of processing such as first restoration processing and second restoration processing, which will be described later. The OS for restoration 33 has a limited function such as a function used for restoring the backup data 31. An example of the OS for restoration 33 is Windows (registered trademark) Preinstallation Environment (Windows (registered trademark) PE). The restoration program 34 operates on the OS for restoration 33 and restores the backup data 31.

The control unit 41 includes an inner memory for storing control data and a program in which various types of processing procedures are defined, thereby executing various types of processing. When the control unit 41 restores the backup data 31, the OS for restoration 33 is started up, on which the restoration program 34 is started up. The restoration program 34 operates on the OS for restoration 33 so that the control unit 41 functions as various types of processors. As illustrated in FIG. 5, the control unit 41 includes a first restoring unit 50, a calculation unit 51, and a starting unit 52, for example.

The first restoring unit 50 is a processor that executes the restoration processing of the backup data 31. The first restoring unit 50 restores files from the backup data 31 to the storage unit 40 according to the mapping information 32. For example, the first restoring unit 50 reads out the item of file name sequentially from the top of the list A included in the mapping information 32 and restores the files listed in the item of file name from the backup data 31 to the storage unit 40. The files listed in the list A may be restored in any order. The first restoring unit 50 then reads out the item of file name according to the order listed in the item of reading order of the list B included in the mapping information 32, and restores the files listed in the item of file name from the backup data 31 to the storage unit 40. Subsequently, the first restoring unit 50 restores the files stored in neither the list A nor the list B from the backup data 31 to the storage unit 40.

Each time the restoration of each of the files is completed, the first restoring unit 50 records the restored file. For example, when the restoration of the files in the list A included in the mapping information 32 is completed, the first restoring unit 50 records that effect in the list A. If the starting unit 52 orders the first restoring unit 50 to end the processing during the restoration of the files, the first restoring unit 50 ends the processing after the restoration of the file being restored is completed.

FIG. 6 is an exemplary diagram of the structure of data in the list A in which the fact that restoration is completed is recorded. As illustrated in FIG. 6, the list A further includes an item of restoration completed flag. The item of restoration completed flag is a field that stores therein whether the restoration is completed. When the restoration is completed "1" is stored, and when the restoration is not yet completed "0" is stored in the item of restoration completed flag. In FIG. 6, the file on the path "C:¥Autoexe.bat" has been restored. In addition, the file on the path "C:¥config.sys" has not yet been restored in FIG. 6.

The calculation unit 51 is a processor that performs various types of calculations. The calculation unit 51 calculates the speed A of restoration achieved when the backup data 31 is restored while the restoration program 34 is operated on the OS for restoration 33. For example, when the first restoring unit 50 restores any one of the files listed in the list A, the calculation unit 51 calculates the speed A by dividing the amount of data of the file by the time period for the restoration. The calculation unit 51 also calculates the speed B of restoration achieved when the backup data 31 is restored in the background while the restoration program 34 is operated on the OS 20. For example, the calculation unit 51 calculates the speed B by multiplying the speed A by a predetermined coefficient that is larger than 0 and smaller than 1. In the present embodiment, the speed B is calculated by multiplying the speed A by ½, for example. The speed B can be calculated from the device structure of the restoration device 13, for example, if it is possible. The speed B may be a fixed value set by an administrator, for example. The speed B may be a restoration speed when restoration is performed previously in the restoration device 13 while running the OS 20.

The calculation unit 51 calculates a timing to cause the first restoring unit 50 to end the restoration of the backup data 31. The calculation unit 51 firstly calculates a time X at which the total amount of the data read out along with the start-up of the OS 20 and the business system 21 becomes equal to or smaller than the total amount of the data restored without running the OS 20. For example, the calculation unit 51 reads out the records one by one according to the order listed in the item of reading order from the list B included in the mapping information 32 and accumulates the amount of the data read out along with the start-up to calculate the total amount of the data read out for each of the time periods listed in the item of reading time. The calculation unit 51 multiplies each time period in the item of reading time by the speed A to calculate the total amount of the data that can be restored at the speed A for each time period in the item of reading time. The calculation unit 51 then compares the amount of data read out with the total amount of the data that can be restored at the speed A for each time period in the item of reading time, and determines the time at which the total amount of the data read out becomes equal to or smaller than the total amount of the data that can be restored at the speed A for the first time, as the time X.

Figure 7:
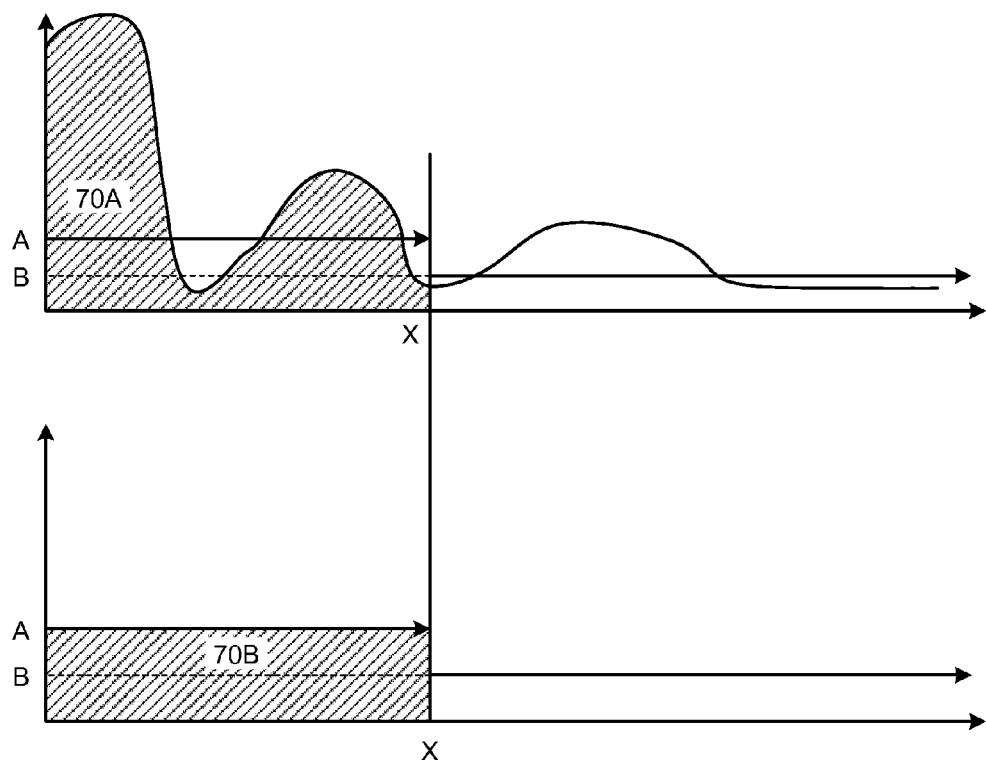
FIG. 7 is a diagram for explaining a time X according to the embodiment.

FIG. 7 is a diagram for explaining the time X. The vertical axes of the upper and lower graphs illustrated in FIG. 7 represent the reading speed of the data. The horizontal axes of the upper and lower graphs illustrated in FIG. 7 represent the time elapsed. The upper graph illustrated in FIG. 7 represents the change of the amount of the data read out along with the start-up of the OS 20 and the business system 21. The lower graph illustrated in FIG. 7 represents the data that can be restored. The calculation unit 51 determines the time at which a total amount of the data 70A read out indicated with hatched lines in the upper graph illustrated in FIG. 7 firstly becomes equal to or smaller than a total amount of the data 70B that can be restored at the speed A, as the time X. In the present embodiment, for example, the time X is a first time point.

Subsequently, the calculation unit 51 calculates a time Y at which the total amount of data read out after the time X along with the start-up of the OS 20 and the business system 21 becomes equal to or smaller than the total amount of data that can be restored from the backup data 31 after the time X while running the OS 20 and the business system 21. For example, the calculation unit 51 reads out the records, of which the reading time is later than the time X one by one according to the order listed in the item of reading order from the list B and accumulates the amount of data read out along with the start-up to calculate the total amount of data read out along with the start-up for each time listed in the item of reading time. The calculation unit 51 multiplies the time period obtained by subtracting the time X from the time in the item of reading time by the speed B to calculate the total amount of the data that can be restored after the time X at the speed B for each time period in the item of reading time. The calculation unit 51 then compares the amount of data read out after the time X with the total amount of data that can be restored after the time X at the speed B for each of the time periods listed in the item of reading time, and determines the time at which the total amount of data read out becomes equal to or smaller than the total amount of data that can be restored at the speed B for the first time, as the time Y.

Figure 8:
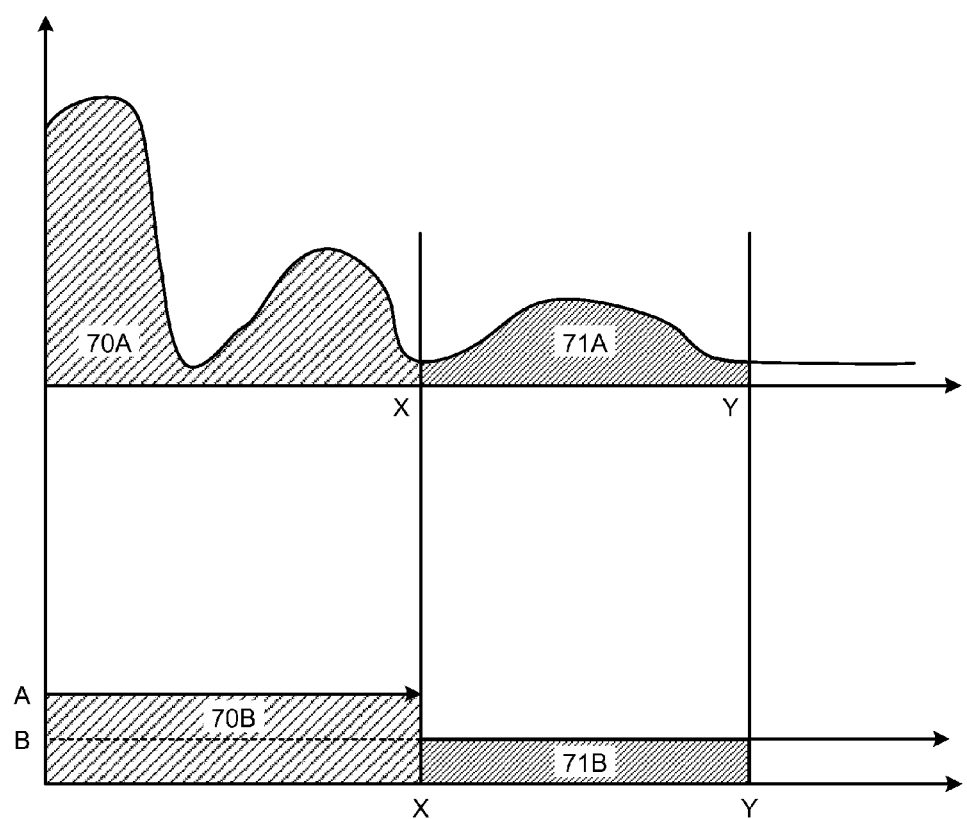
FIG. 8 is a diagram for explaining a time Y according to the embodiment.

FIG. 8 is a diagram for explaining the time Y. The vertical axes of the upper and lower graphs illustrated in FIG. 8 represent the reading speed of the data. The horizontal axes of the upper and lower graphs illustrated in FIG. 8 represent the time elapsed. The upper graph illustrated in FIG. 8 represents the change of the amount of the data read out along with the start-up of the OS 20 and the business system 21. The lower graph illustrated in FIG. 8 represents the data that can be restored. The calculation unit 51 determines the time at which a total amount of the data 71A read out after the time X indicated with hatched lines in the upper graph illustrated in FIG. 8 firstly becomes equal to or smaller than a total amount of the data 71B that can be restored after the time X using the speed B as the time Y. In the present embodiment, for example, the time Y is a second time point.

The calculation unit 51 then calculates a time period "a" required for restoring, at the speed A, data of an amount equal to the amount read out after the time X until the time Y along with the start-up of the OS 20 and the business system 21. For example, the calculation unit 51 calculates the time period "a" by dividing the total amount of the data 71A read out after the time X by the speed A.

Figure 9:
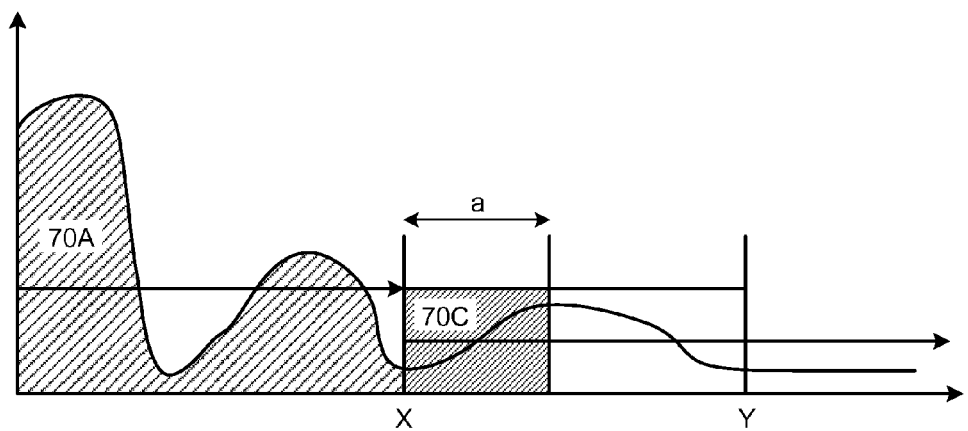
FIG. 9 is a diagram for explaining a time period a according to the embodiment.

FIG. 9 is a diagram for explaining the time period "a". The vertical axis of the graph illustrated in FIG. 9 represents the reading speed of the data. The horizontal axis of the graph illustrated in FIG. 9 represents the time elapsed. The graph illustrated in FIG. 9 represents the change of the amount of the data read out along with the start-up of the OS 20 and the business system 21. The calculation unit 51 determines the time period during which the total amount of data 70C that can be restored after the time X at the speed A becomes equal to the total amount of the data 70A read out during a period between the time X and the time Y as the time period a. In the present embodiment, for example, the time X+a is a third time point.

The calculation unit 51 calculates a time Z at which the reading speed of the data read out along with the start-up of the OS 20 and the business system 21 becomes equal to or larger than the speed B. The time Z is a time point immediately before the time Y. For example, the calculation unit 51 calculates the reading speed of the data according to the following procedure: the calculation unit 51 obtains the time difference of the reading time between one of the records and the subsequent record in the reading order listed in the list B, for each file to be read out before the time Y listed in the list B included in the mapping information 32 and divides the amount of the data of the file by the time difference. The calculation unit 51 then compares the reading speed with the speed B in the reverse order of the reading order, for each file to be read out before the time Y listed in the list B. The calculation unit 51 determines the file of which reading speed is equal to or faster than the speed B and determines the time at which the determined file is read out as the time Z. In the present embodiment, for example, the time Z is a fourth time point.

Subsequently, the calculation unit 51 subtracts the amount of data read out from the time Z to the time Y, from the amount of data read out from the time X to the time Y along with the start-up of the OS 20 and the business system 21, thereby calculating the time period a' during which the data is restored from the backup data 31 at the speed A. The calculation unit 51 may calculate the time period a' by dividing the total amount of the data read out after the time X up to the time Z by the speed A.

Figure 10:
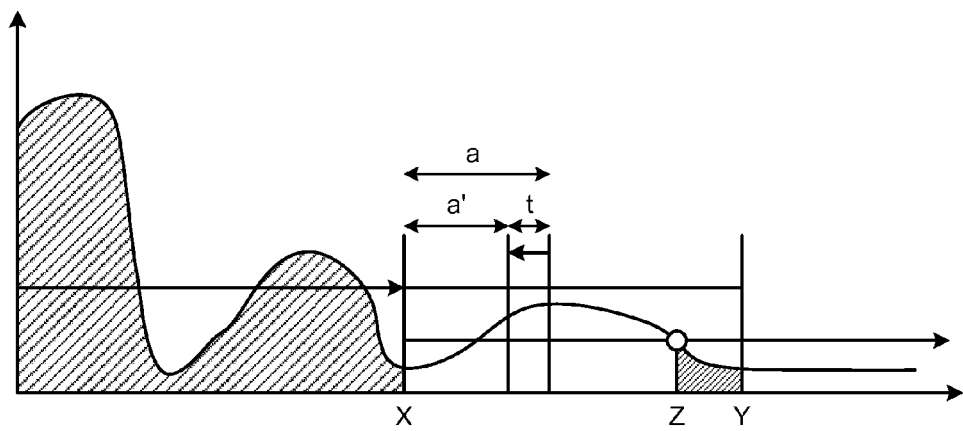
FIG. 10 is a diagram for explaining a time period a' according to the embodiment.

FIG. 10 is a diagram for explaining the time period a'. The vertical axis of the graph illustrated in FIG. 10 represents the reading speed of the data. The horizontal axis of the graph illustrated in FIG. 10 represents the time elapsed. The graph illustrated in FIG. 10 represents the change of the amount of the data read out along with the start-up of the OS 20 and the business system 21. The calculation unit 51 calculates the time period a' during which the data of an amount obtained by subtracting the amount read out from the time Z to the time Y from the amount read out from the time X to the time Y is restored from the backup data 31 at the speed A. The time period a' is shorter than the time period a, because the data read out from the time Z to the time Y is excluded. In the present embodiment, for example, the sum of the time X and the time period a' is a fifth time point.

With reference to FIG. 5 again, the starting unit 52 determines the timing when the sum of the time X and the time period a' has elapsed since the beginning of the restoration of the file in the list B by the first restoring unit 50 as the predetermined time point described above at which the starting unit 52 orders the first restoring unit 50 to end the processing. In the present embodiment, the starting unit 52 orders the first restoring unit 50 to end the processing at the timing when the sum of the time X and the time period a' has elapsed. The starting unit 52 may determine the timing when the sum of the time X and the time period a' has elapsed since the beginning of the restoration of the file in the list B by the first restoring unit 50 as the predetermined time point described above at which the starting unit 52 orders the first restoring unit 50 to end the processing.

The starting unit 52 orders the start-up of the restored OS 20 and business system 21. When starting up the OS 20 and the business system 21 after restarting the restoration device 13, the starting unit 52 orders the OS for restoration 33 to restart the restoration device 13.

Figure 11:
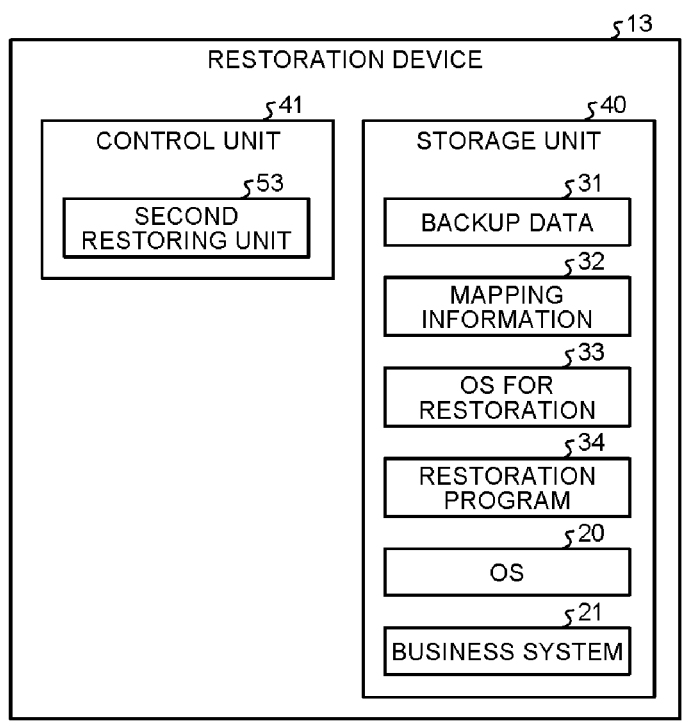
FIG. 11 is an exemplary diagram of the function structure of the restoration device in which a part of the backup data has been restored according to the embodiment.

FIG. 11 is an exemplary diagram of the function structure of the restoration device in which a part of the backup data is restored. FIG. 11 exemplifies the state in which the restoration of the backup data 31 is completed until the timing when the sum of the time X and the time period a' has elapsed. The OS 20 can be started up because the files for the start-up recorded in the list A included in the mapping information 32 have been restored.

The OS 20 is started up, on which the restoration program 34 and the business system 21 are started up in the control unit 41. The restoration program 34 operates on the OS 20 so that the control unit 41 functions as various types of processors. As illustrated in FIG. 11, the control unit 41 includes a second restoring unit 53.

The second restoring unit 53 is a processor that restores the backup data 31 in parallel with the start-up of the OS 20 and the business system 21. The second restoring unit 53 restores the backup data 31 in the background in parallel with the start-up of the OS 20 and the business system 21. For example, the second restoring unit 53 restores the files that have not been restored from the backup data 31 to the storage unit 40 in the order of the reading order by the OS 20 according to the mapping information 32.

Figure 12:
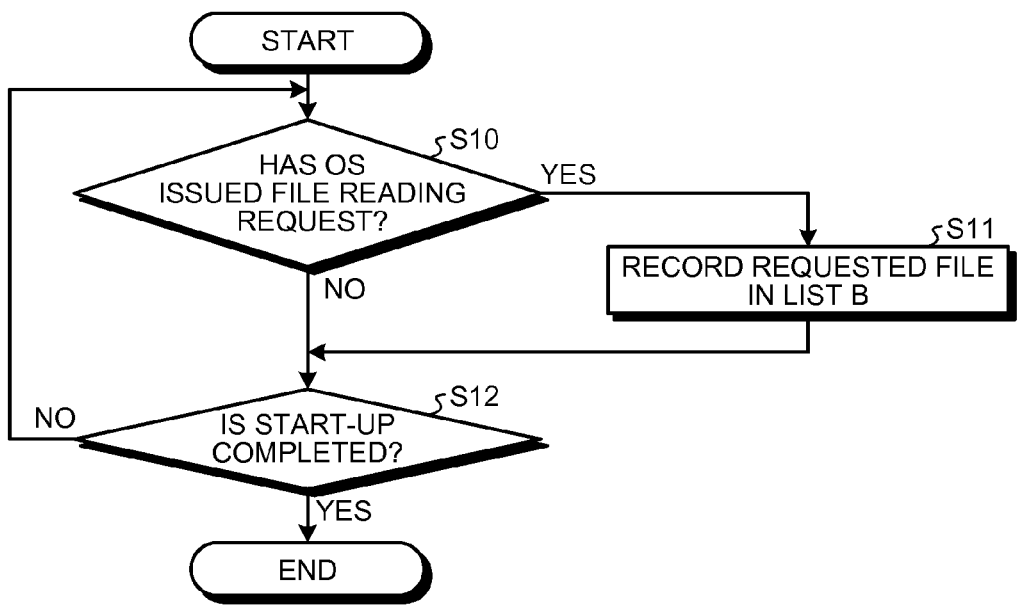
FIG. 12 is a flowchart of procedures of generation processing according to the embodiment.

The flow of generation processing will now be described in which the filter driver 22 of the server device 11 according to the present embodiment monitors the OS 20 reading the files and generates the list B. FIG. 12 is a flowchart of procedures of generation processing. This generation processing is executed when the filter driver 22 is started up, for example.

As illustrated in FIG. 12, the filter driver 22 determines whether the OS 20 has issued a file reading request (S10). If the OS 20 has issued the file reading request (Yes at S10), the filter driver 22 records a file name of the file for which a reading request is issued, a time period from the start-up of the filter driver 22 to the issue of the reading request, an amount of data of the file in the list B (S11). If the OS 20 has issued no file reading request (No at S10), the processing is proceeded to S12, which will be described later.

The filter driver 22 determines whether the start-up of the OS 20 is completed (S12). If the start-up of the OS 20 is completed (Yes at S12), the processing is ended. If the start-up of the OS 20 is not completed (No at S12), the processing is returned to S10 described above.

The flow of backup processing will now be described in which the backup software 30 of the backup device 12 according to the present embodiment backs up the OS 20 and the business system 21 that operate on the server device 11.

Figure 13:
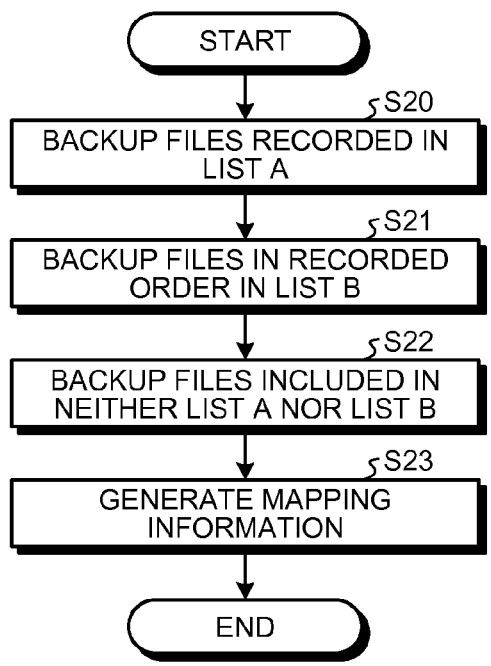
FIG. 13 is a flowchart of procedures of backup processing according to the embodiment.

FIG. 13 is a flowchart of procedures of the backup processing. This backup processing is executed when, for example, a predetermined operation that orders the backup of the OS 20 and the business system 21 of the server device 11 is performed in the backup device 12.

As illustrated in FIG. 13, the backup software 30 sequentially reads out the data of the files recorded in the list A from the server device 11 and backs up the data (S20). The backup software 30 then sequentially reads out the data of the files recorded in the list B from the server device 11 according to the reading order and backs up the data (S21). The backup software 30 also sequentially reads out the data of the files recorded in neither the list A nor the list B and backs up the data (S22). After that, the backup software 30 generates the mapping information 32 in which the list A and the list B are included and the backed up files are recorded (S23), and the processing is ended.

Figure 14:
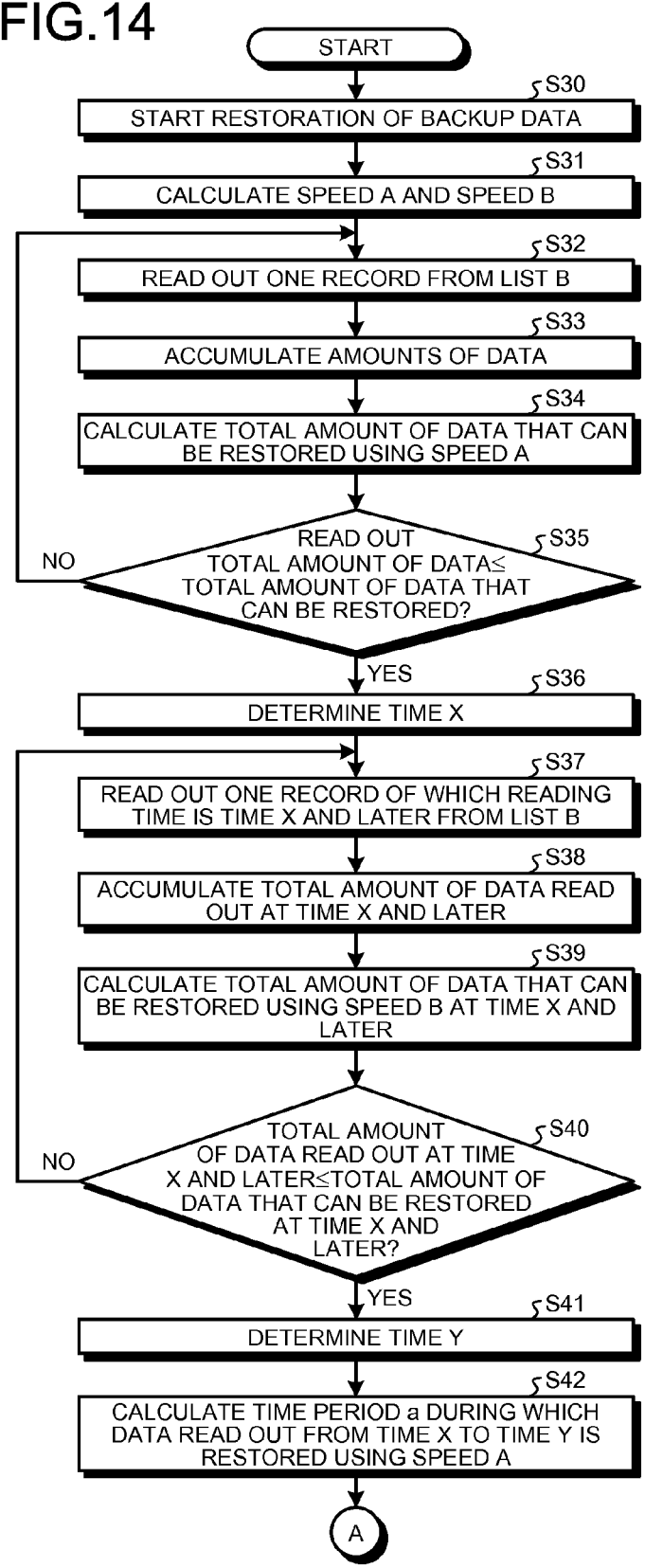
FIG. 14 is a flowchart of procedures of first restoration processing according to the embodiment.
Figure 15:
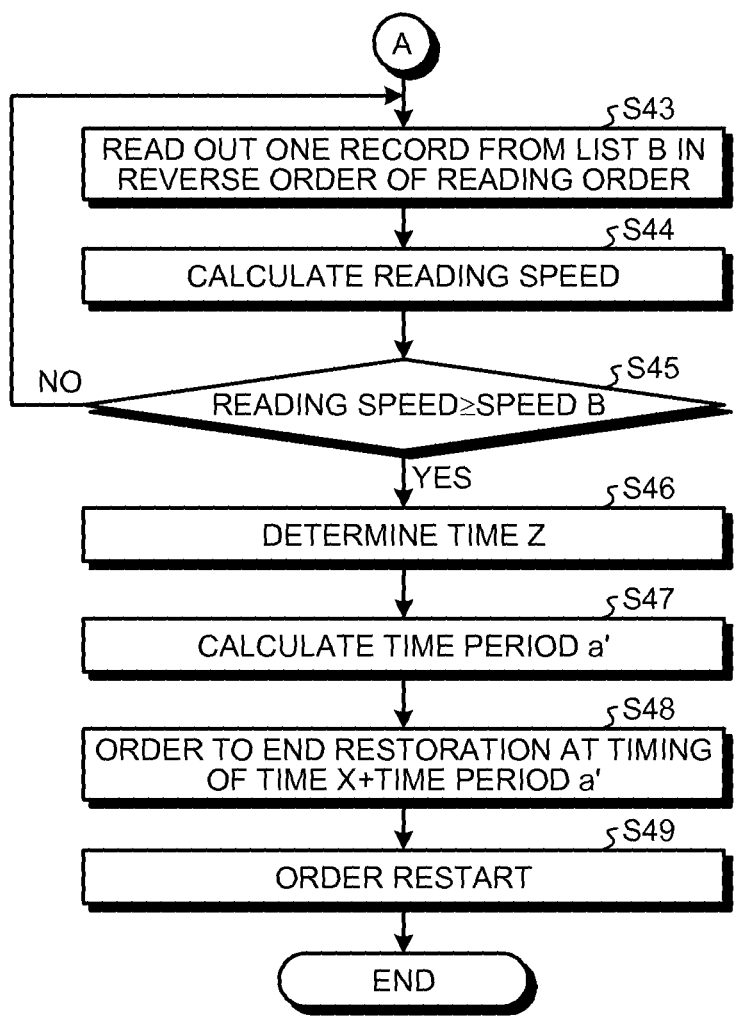
FIG. 15 is a flowchart of procedures of the first restoration processing according to the embodiment.

The flow of the first restoration processing will now be described in which the restoration device 13 according to the present embodiment restores the backup data 31 without running the OS 20 and the business system 21. FIGS. 14 and 15 are flowcharts of procedures of the first restoration processing. This first restoration processing is executed when, for example, the OS for restoration 33 and the restoration program 34 are started up on the restoration device 13 and a predetermined operation that orders the restoration of the backup data 31 is performed.

As illustrated in FIG. 14, the first restoring unit 50 starts the restoration of the backup data 31 according to the mapping information 32 (S30). After starting the restoration, the first restoring unit 50 restores the data from the backup data 31 in the order from the files listed in the list A included in the mapping information 32, the files listed in the list B included in the mapping information 32, and the files listed in neither the list A nor the list B.

When any of the files listed in the list A is restored by the first restoring unit 50, the calculation unit 51 calculates the speed A by dividing the amount of data of the file by the time period of the restoration. The calculation unit 51 also calculates the speed B by multiplying the speed A by a predetermined coefficient (S31).

The calculation unit 51 reads out one record according to the reading order from the list B included in the mapping information 32 (S32) and accumulates the amounts of the data of the read out record stored in the item of file size (S33). The calculation unit 51 calculates the total amount of the data that can be restored using the speed A by multiplying the time periods of the read out records listed in the item of reading time by the speed A (S34). The calculation unit 51 then determines whether the accumulated read out total amount of the data is equal to or smaller than the total amount of the data that can be restored at the speed A (S35). If the accumulated read out total amount of the data is not equal to or smaller than the total amount of the data that can be restored at the speed A (No at S35), the processing is returned to S32 described above. If the accumulated read out total amount of the data is equal to or smaller than the total amount of the data that can be restored at the speed A (Yes at S35), the calculation unit 51 determines the time of the read out record listed in the item of reading time as the time X (S36).

The calculation unit 51 reads out one record of which the reading time is after the time X according to the reading order from the list B included in the mapping information 32 (S37) and accumulates the amounts of the data of the read out records stored in the item of file size (S38). The calculation unit 51 calculates the total amount of the data that can be restored after the time X using the speed B by multiplying the time obtained by subtracting the time X from the time of the read out record listed in the item of reading time by the speed B (S39). The calculation unit 51 then determines whether the read out total amount of the data after the time X is equal to or smaller than the total amount of the data that can be restored at the speed B (S40). If the accumulated total amount of the data read out after the time X is not equal to or smaller than the total amount of the data that can be restored at the speed B (No at S40), the processing is returned to S37 described above. If the accumulated total amount of the data read out after the time X is equal to or smaller than the total amount of the data that can be restored at the speed B (Yes at S40), the calculation unit 51 determines the time of the read out record listed in the item of reading time as the time Y (S41). After that, the calculation unit 51 calculates the time period a, during which data of an amount equal to the amount of data read out from the time X to the time Y is restored from the backup data 31 at the speed A (S42).

As illustrated in FIG. 15, the calculation unit 51 reads out one subsequent record listed in the list B in the reverse order of the reading order from the last read out record at S37 described above (S43). The calculation unit 51 obtains the time difference of the reading time between the read out record above and the subsequent record in the reading order listed in the list B that has been read out last. The calculation unit 51 then calculates the reading speed of the data by dividing the amount of the data of the read out record by the time difference (S44).

The calculation unit 51 compares the calculated reading speed with the speed B and determines whether the reading speed is equal to or faster than the speed B (S45). If the reading speed is not equal to or faster than the speed B (No at S45), the processing is returned to S43 described above. If the reading speed is equal to or faster than the speed B (Yes at S45), the calculation unit 51 determines the time of the read out record listed in the item of reading time as the time of Z (S46). The calculation unit 51 then obtains a time period t by dividing the total amount of the data read out from the time Z to the time Y by the speed A, and calculates the time period a' by subtracting the time period t from the time period a (S47).

The starting unit 52 orders the first restoring unit 50 to end the processing at the timing when the sum of the time X and the time period a' has elapsed since the beginning of the restoration of the file in the list B by the first restoring unit 50 (S48). The starting unit 52 then orders the restart of the restored OS 20 and business system 21, and the processing is ended (S49).

The flow of the second restoration processing will now be described in which the restoration device 13 according to the present embodiment restores the backup data 31 while running the OS 20 and the business system 21. FIG. 16 is a flowchart of procedures of the second restoration processing. This second restoration processing is executed when, for example, the OS 20 is running on the restoration device 13, on which the restoration program 34 is started up.

As illustrated in FIG. 16, the second restoring unit 53 restores the backup data 31 after the time period a' in the background, in parallel with the start-up of the OS 20 and the business system 21 (S60). Once the restoration is completed, the processing is ended.

As described above, the restoration device 13 restores the data without running the OS 20 or the business system 21 until a predetermined time point until which the total amount of the data read out along with the start-up of the OS 20 and the business system 21 remains equal to or smaller than the total amount of the data that can be restored while running the OS 20 and the business system 21. After the predetermined time point, the restoration device 13 starts up the OS 20 and the business system 21. The restoration device 13 restores the backup data 31 after the predetermined time point, in parallel with the start-up of the OS 20 and the business system 21. This enables the restoration device 13 to prevent a long business downtime.

The restoration device 13 calculates the time X at which the total amount of the data read out along with the start-up of the OS 20 and the business system 21 becomes equal to or smaller than the total amount of the data that can be restored when the backup data 31 is restored without running the OS 20. The restoration device 13 also calculates the time Y at which the total amount of the data read out after the time X along with the start-up of the OS 20 and the business system 21 becomes equal to or smaller than the total amount of the data that can be restored from the backup data 31 after the time X while running the OS 20 and the business system 21. The restoration device 13 further calculates the sum of the time X and the time period "a" during which data of an amount equal to the amount of data read out along with the start-up of the OS 20 and the business system 21 during the time period from X to Y is restored from the backup data 31 without running the OS 20. The restoration device 13 then restores the backup data 31 without running the OS 20 until the sum of the time X and the time period "a" elapses. This enables the restoration device 13 to prevent the state in which the restoration of the data used for the start-up of the business system 21 has to be waited for.

The restoration device 13 calculates the time Z at which the reading speed of the data read out along with the start-up of the OS 20 and the business system 21, immediately before the time Y, becomes equal to or larger than the speed with which the data is restored from the backup data 31 while running the OS 20 and the business system 21. The restoration device 13 calculates the sum of the time X and the time period a' during which data of an amount equal to the amount of data read out during the time period from X to Z is restored from the backup data 31 without running the OS 20. This enables the restoration device 13 to prevent the state in which the restoration of the data used for the business system 21 has to be waited for, thereby further reducing a business downtime.

The restoration device 13 restores the files for the start-up of the OS 20 from the backup data 31. The restoration device 13 then restores the backup data 31 in the reading order of the OS 20 without running the OS 20 until the predetermined time point described above. This enables the restoration device 13 to quickly start up the OS 20 after the restoration and prevent the operation of the OS 20 after the start-up from being suspended in wait for the restoration of the data.

[b] Second Embodiment

While the embodiment relating to the apparatus disclosed herein has been described, the disclosed technology can be embodied in various types of embodiments other than the above-described embodiment. Another embodiment according to the present invention will be described hereinafter.

The restoration program 34 has been described as a program in the first embodiment, however, the disclosed apparatus is not limited to this example. The restoration program 34 may include a plurality of programs. For example, the restoration program 34 may include a program operated on the OS for restoration 33 and a program operated on the OS 20.

The second restoring unit 53 restores the files from the backup data 31 according to the mapping information 32 in the description of the first embodiment, however, the disclosed apparatus is not limited to this example. If the readout of the data not yet restored is requested, the second restoring unit 53 may preferentially restore the requested data. This prevents the state in which the restoration of the data requested to be read out is waited for.

When the backup data 31 is restored, the restoration program 34 is operated on the OS for restoration 33 in the description of the first embodiment, however, the disclosed apparatus is not limited to this example. The restoration program 34 may be generated to include a program for controlling the hardware for the restoration of the backup data 31, whereby the restoration can be performed by the restoration program 34 alone.

If the backup data 31 is different data from the mapping information 32 in the first embodiment described above, the backup data 31 may include the mapping information 32.

Furthermore, each of the elements of the devices illustrated in the drawings is merely a depiction of concepts or functionality, and is not necessarily configured physically in the manner illustrated in the drawings. In other words, specific configurations in which each of the devices is distributed or integrated are not limited to those illustrated in the drawings. More specifically, the whole or a part of the devices may be distributed or integrated functionally or physically in any units depending on various loads or utilization. For example, the processors, the first restoring unit 50, the calculation unit 51, the starting unit 52, and the second restoring unit 53 illustrated in FIGS. 5 and 11 may be integrated. The whole or a part of the processing functions executed in each of the processors may be implemented as a CPU and a computer program parsed and executed by the CPU, or implemented as hardware using wired logics.

Restoration Program

Various types of processing described in the embodiments above may also be implemented by executing a preliminary prepared program on a workstation or other computer systems. The computer system is therefore exemplified hereinafter that executes a program having the same function as the above-described embodiments. FIG. 17 is a diagram of a computer executing a restoration program.

As illustrated in FIG. 17, a computer 300 includes a CPU 310, a read only memory (ROM) 320, a hard disk drive (HDD) 330, and a random access memory (RAM) 340. These components from 310 to 340 are coupled to each other through a bus 400.

The ROM 320 preliminarily stores therein a restoration program 320a that has the same functions as the processors described in the embodiments above. For example, the ROM 320 preliminarily stores therein the restoration program 320a having the same functions as the first restoring unit 50, the calculation unit 51, the starting unit 52, and the second restoring unit 53 in the first embodiment. The restoration program 320a can be separated from the ROM 320 as necessary.

The HDD 330 stores therein various types of data such as backup data 330a.

The CPU 310 reads out the restoration program 320a from the ROM 320 and executes the restoration program 320a, the same operations are performed as the processors according to the first embodiment. That is to say, the restoration program 320a executes the same operations as the first restoring unit 50, the calculation unit 51, the starting unit 52, and the second restoring unit 53 according to the first embodiment.

The restoration program 320a is not always to be stored in the ROM 320 preliminarily, and may be stored in the HDD 330.

For example, the program may be stored in a "portable physical medium" to be inserted in the computer 300, such as a flexible disk (FD), a compact disk read-only memory (CD-ROM), a digital versatile disk (DVD), a magneto-optical disk (MO), and an integrated circuit (IC) card. The computer 300 may read out the program from such a portable physical medium and execute the program.

The program may be stored in "another computer (or a server)" coupled to the computer 300 through a public line, the Internet, a LAN, or a WAN, for example. The computer 300 may read out the program from such a network and execute the program.

According to an aspect of an embodiment of the present invention, a long business downtime can be prevented.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process, the process comprising:
   calculating a first time point, the first time point being a time point at which a first total amount becomes larger than a second total amount, the first total amount being a total amount of data read out for start-up of an operating system and a business system after a restoration begins, and the second total amount being a total amount of data restored from backup data of the operating system and the business system after the restoration begins without running the operating system,
   restoring data from the backup data without running the operating system up to the first time point;
   starting up the operating system and the business system after the first time point; and
   continuing to restore the backup data after the first time point in parallel with the start-up of the operating system and the business system.

2. The computer-readable recording medium according to claim 1, wherein the process further comprises:
   calculating a second time point at which a total amount of data read out after the first time point for the start-up of the operating system and the business system becomes equal to or smaller than a total amount of data restored;
   after the first time point and later from the backup data while running the operating system and the business system; and
   calculating a third time point at which data of an amount equal to an amount of data read out for the start-up of the operating system and the business system after the first time point up to the second time point is restored from the backup data without running the operating system, wherein
   the starting up starts up the operating system and the business system after the third time point.

3. The computer-readable recording medium according to claim 1, wherein the process further comprises
   calculating a second time point at which a total amount of data read out after the first time point for the start-up of the operating system and the business system becomes equal to or smaller than a total amount of data restored after the first time point from the backup data while running the operating system and the business system;

calculating a third time point at which data of an amount equal to an amount of data read out for the start-up of the operating system and the business system after the first time point up to the second time point is restored from the backup data without running the operating system;

calculating a fourth time point at which a reading speed of data read out for the start-up of the operating system and the business system becomes equal to or faster than a restoring speed of data from the backup data while the operating system and the business system are running, the fourth time point being a last time point at which the reading speed becomes equal to or faster than the restoring speed prior to the second time point, and calculating a fifth time point at which data of an amount equal to an amount of data read out for the start-up of the operating system and the business system after the first time point up to the fourth time point is restored from the backup data without running the operating system; wherein the starting up starts up the operating system and the business system after the fifth time point.

4. The computer-readable recording medium according to claim 1, wherein the restoring restores files in the reading order of the operating system from the backup data.

5. A restoration apparatus comprising:

a storage unit that stores therein backup data in which an operating system and a business system are backed up;

a calculation unit that calculates a first time point, the first time point being a time point at which a first total amount becomes larger than a second total amount, the first total amount being a total amount of data read out for start-up of the operating system and the business system after a restoration begins, and the second total amount being a total amount of data restored from backup data after the restoration begins without running the operating system, a first restoring unit that restores data from the backup data without running the operating system up to the first time point;

a starting unit that starts up the operating system and the business system after the first time point; and a second restoring unit that continues restoring of the backup data after the first time point in parallel with the start-up of the operating system and the business system.

6. The restoration apparatus according to claim 5, further comprising a calculation unit that calculates a second time point at which a total amount of data read out after the first time point for the start-up of the operating system and the business system becomes equal to or smaller than a total amount of data restored after the first time point from the backup data while running the operating system and the business system, and a third time point at which data of an amount equal to an amount of data read out for the start-up of the operating system and the business system after the first time point up to the second time point is restored from the backup data without running the operating system; wherein the starting unit starts up the operating system and the business system after the third time point.

7. The restoration apparatus according to claim 5, wherein the calculation unit further calculates a second time point at which a total amount of data read out after the first time point for the start-up of the operating system and the business system becomes equal to or smaller than a total amount of data restored after the first time point from the backup data while running the operating system and the business system, a third time point at which data of an amount equal to an amount of data read out for the start-up of the operating system and the business system after the first time point up to the second time point is restored from the backup data without running the operating system, a fourth time point at which a reading speed of data read out for the start-up of the operating system and the business system becomes equal to or faster than a restoring speed of data from the backup data while the operating system and the business system are running, the fourth time point being a last time point at which the reading speed becomes equal to or faster than the restoring speed prior to the second time point, and a fifth time point at which data of an amount equal to an amount of data read out for the start-up of the operating system and the business system after the first time point up to the fourth time point is restored from the backup data without running the operating system; wherein the starting unit starts up the operating system and the business system after the fifth time point.

8. The restoration apparatus according to claim 5, wherein the first restoring unit restores files in the reading order of the operating system from the backup data.

9. A restoration apparatus comprising:

a processor; and a memory, wherein the memory stores therein backup data in which an operating system and a business system are backed up, the processor executes a process comprising:

calculating a first time point, the first time point being a time point at which a first total amount becomes larger than a second total amount, the first total amount being a total amount of data read out for start-up of the operating system and the business system after a restoration begins, and the second total amount being a total amount of data restored from backup data of the operating system and the business system after the restoration begins without running the operating system, restoring data from the backup data without running the operating system up to the first time point;

starting up the operating system and the business system after the first time point; and continuing to restore the backup data after the first time point in parallel with the start-up of the operating system and the business system.

10. The restoration apparatus according to claim 9, wherein the process further comprises:

calculating a second time point at which a total amount of data read out after the first time point for the start-up of the operating system and the business system becomes equal to or smaller than a total amount of data restored after the first time point from the backup data while running the operating system and the business system; and calculating a third time point at which data of an amount equal to an amount of data read out for the start-up of the operating system and the business system after the first time point up to the second time point is restored from the backup data without running the operating system; wherein the starting starts up the operating system and the business system after the third time point.

11. The restoration apparatus according to claim 9, wherein the process further comprises:

calculating a second time point at which a total amount of data read out after the first time point for the start-up of the operating system and the business system becomes equal to or smaller than a total amount of data restored after the first time point from the backup data while running the operating system and the business system;

calculating a third time point at which data of an amount equal to an amount of data read out for the start-up of the operating system and the business system after the first time point up to the second time point is restored from the backup data without running the operating system;

calculating a fourth time point at which a reading speed of data read out for the start-up of the operating system and the business system becomes equal to or faster than a restoring speed of data from the backup data while the operating system and the business system are running, the fourth time point being a last time point at which the reading speed becomes equal to or faster than the restoring speed prior to the second time point, and calculating a fifth time point at which data of an amount equal to an amount of data read out for the start-up of the operating system and the business system after the first time point up to the fourth time point is restored from the backup data without running the operating system; wherein the starting up starts up the operating system and the business system after the fifth time point.

12. The restoration apparatus according to claim 9, wherein the restoring restores files in the reading order of the operating system from the backup data.

\* \* \* \* \*